United States Patent
Tanaka

(10) Patent No.: US 7,230,577 B2
(45) Date of Patent: Jun. 12, 2007

(54) WIRELESS TERMINAL POSITION DETECTING DEVICE AND METHOD

(75) Inventor: Akitomo Tanaka, Kasugai (JP)

(73) Assignee: Omron Corporation, Kyoto (JP)

( * ) Notice: Subject to any disclaimer, the term of this patent is extended or adjusted under 35 U.S.C. 154(b) by 178 days.

(21) Appl. No.: 10/919,882

(22) Filed: Aug. 16, 2004

(65) Prior Publication Data

US 2005/0046568 A1 Mar. 3, 2005

(30) Foreign Application Priority Data

Sep. 1, 2003 (JP) .............................. 2003-309426

(51) Int. Cl.
*H01Q 1/32* (2006.01)
*B60L 1/00* (2006.01)
*G05B 19/00* (2006.01)

(52) U.S. Cl. ....................... 343/711; 307/10.1; 340/5.61

(58) Field of Classification Search ............... 340/5.61, 340/425.5; 307/10.1; 343/711, 713
See application file for complete search history.

(56) References Cited

U.S. PATENT DOCUMENTS

| | | | |
|---|---|---|---|
| 6,208,239 B1 | 3/2001 | Muller et al. ............... 340/426 |
| 6,552,649 B1 * | 4/2003 | Okada et al. ............... 340/5.61 |
| 6,700,476 B1 * | 3/2004 | Okada et al. ............... 340/5.62 |
| 6,778,065 B1 * | 8/2004 | Asakura et al. ............ 340/5.61 |
| 2003/0058086 A1 * | 3/2003 | Hara ....................... 340/425.5 |
| 2004/0046451 A1 * | 3/2004 | Shibagaki et al. ......... 307/10.2 |
| 2004/0061660 A1 * | 4/2004 | Yoshida et al. ............. 343/788 |
| 2004/0085189 A1 * | 5/2004 | Nagai et al. ............... 340/5.72 |

OTHER PUBLICATIONS

European patent application No. 04 020 149.3-2220, Examination Report dated Sep. 26, 2005.

* cited by examiner

*Primary Examiner*—Shih-Chao Chen
(74) *Attorney, Agent, or Firm*—Beyer Weaver LLP

(57) ABSTRACT

A wireless terminal position detecting device for a portable device includes a plural n-number of transmission antennas disposed such that a portion of their reachable areas overlap, a signal dividing device for dividing a request signal into the plural n-number of divided parts, and a signal distributing device for causing the divided parts of the request signal to be transmitted sequentially from these transmission antennas. The position of the portable device is detected based on an answer signal returned from the portable device in response to the request signal.

5 Claims, 12 Drawing Sheets

WIRELESS TERMINAL POSITION DETECTING DEVICE AND METHOD

Priority is claimed on Japanese Patent Application 2003-309426 filed Sep. 1, 2003.

BACKGROUND OF THE INVENTION

This invention relates to a device and method for detecting the position of a portable compact wireless terminal. More particularly, the invention relates to such a device and a method for making a detection within a limited range of area such that when the invention is applied to the keyless entry system of a vehicle such as an automobile, for example, it becomes possible to detect whether the terminal of the system is inside the vehicle or not and enables the user to control the vehicle such as the unlocking of its door, corresponding to the result of its position detection and to carry out a control of the vehicle corresponding to the result of this position detection.

In recent years, some vehicles such as automobiles (hereinafter simply referred to as "vehicles") are coming to be produced with a convenient system mounted thereto for allowing the door to be unlocked or the engine to be started without using a mechanical key but merely by installing a small wireless terminal (hereinafter referred to as a "portable device") near or inside the chamber of the vehicle. Such systems carry various different names such as "smart entry system" and "intelligent key system".

The component of such a system carried inside the vehicle must be always aware whether its portable device is inside the chamber of the vehicle or not. It is because it will be like locking in a car key if the request button for the door is pressed with the portable device left inside the vehicle chamber. For such a situation, the system must be designed so as to output an alarm or not to lock the doors. It should thus be clear that such a position detector is necessary also from the point of view of crime prevention. What would happen if a total stranger pressed the request button while the vehicle is temporarily stopped, say, by a red light at a cross-road? For such a situation, the operation on the request button should be invalidated so as to prevent the total stranger from invasively entering the vehicle.

Japanese Patent Publication Tokkai 2003-3715 disclosed a technology of detecting the position of such a portable device (that is, whether it is inside the vehicle chamber or not), providing a (first) transmission antenna with the transmission area limited to the exterior of the vehicle and another (second) transmission antenna with the transmission area limited to the interior of the vehicle. According to this technology, request signals are transmitted to the portable device at different timings from the two antennas such that the position of the portable device can be detected from the presence or absence of an answer signal returned in response to these request signals. If the answer signal is returned when the request signal is transmitted from the first antenna, it is concluded that the portable device is outside the vehicle chamber. If the answer signal is returned when the request signal is transmitted from the second antenna, it is concluded that the portable device is inside the vehicle chamber. This technology is disadvantageous because two transmission antennas are required and hence this affects the production cost adversely.

SUMMARY OF THE INVENTION

It is therefore an object of this invention to dispense with the antenna for the interior of the vehicle such that the production cost of the device can be reduced.

A wireless terminal position detecting device according to this invention may be characterized as comprising a portable device, a plural n-number of transmission antennas each having a reachable area inside which communication is possible, these transmission antennas being disposed such that a portion of their reachable areas overlap, a signal dividing device for dividing a request signal into the plural n-number of divided parts, and a signal distributing device for causing the divided parts to be transmitted sequentially from these transmission antennas, wherein the position of the portable device is detected based on an answer signal returned therefrom in response to the request signal.

A wireless method of detecting the position of a portable device according to this invention may be characterized as comprising the steps of positioning a plural n-number of transmission antennas each having a reachable area inside which communication is possible, positioning these transmission antennas such that a portion of their reachable areas overlap, dividing a request signal into the plural n-number of divided parts, and causing these divided parts to be transmitted sequentially from the transmission antennas, wherein the position of the portable device is detected based on an answer signal returned therefrom in response to the request signal.

In the above, it is preferable to divide the request signal into divided parts such that these divided parts have mutually overlapping parts.

According to this invention, divided parts of the request signal are sequentially transmitted from a plurality of transmission antennas disposed such that the areas reachable by them are overlapping. Thus, if the portable device is in this overlapping area, all of the divided parts of the request signal are received by the portable device. Thus, if the overlapping area coincides with the interior of an vehicle, it may be concluded that the portable device is inside the vehicle when an answer signal is returned in response to all of the divided parts of the request signal. Thus, the position of the portable device can be detected without providing any antenna exclusively for the detection inside the vehicle. Since the number of the transmission antenna can be reduced, the overall production cost can also be reduced. When the request signal is divided into parts, if the divisions are made such that overlapping portions are left between the continuing parts, data can be more dependably prevented from becoming missing such that reliability of communication can be improved.

DETAILED DESCRIPTION OF THE INVENTION

The invention is described next by way of an example with reference to drawings. This example, however, is for the purpose of explaining the basic idea of the invention and hence neither its whole nor its parts are intended to limit the scope of the invention. Some of the means, routines and architectures are not described in detail because they are known among persons skilled in the art and in order to simplify the explanation. These omitted explanations, therefore, are not intended to be excluded from the invention.

Figures 1A, 1B:
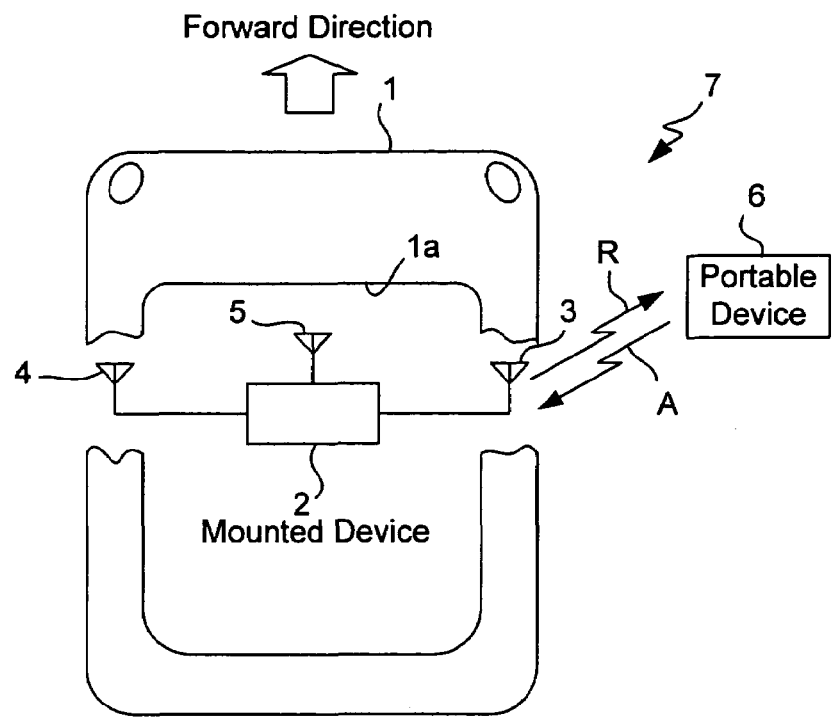
FIG. 1A is a conceptual diagram showing the structure of a wireless terminal position detection device embodying this invention and FIG. 1B is a transmission diagram for the antennas.

In FIG. 1A which is a conceptual diagram showing the structure of a wireless terminal position detection device 7 embodying this invention, numeral 2 indicates a component which is mounted to a vehicle 1 and will be hereinafter referred to as the "mounted device" and to which a plural number (=n, n being 2 in the illustrated example) of transmission antennas (hereinafter referred to as the first transmission antenna 3 and the second transmission antenna 4) and a reception antenna 5 are connected. The transmission antennas 3 and 4 are set on the right-hand and left-hand edge parts of the vehicle chamber 1a (such as on the interior sides of the right-hand and left-hand side doors or the pillar parts of these doors), and the reception antenna 5 may be near the center of the vehicle chamber 1a.

Numeral 6 indicates a portable device 6 which is positioned outside the vehicle 1 in this example. The mounted device 2, the transmission antennas 3 and 4, the reception antenna 5 and the portable device 6 together form the wireless terminal position detection device 7.

The mounted device 2 and the portable device 6 are adapted to mutually exchange data through two wireless channels, one of the channels being a "down-channel" for transmission from (the transmission antennas 3 and 4 connected to) the mounted device 2 to the portable device 6, the other of the channels being an "up-channel" for transmission from the portable device 6 to (the transmission antennas 3 and 4 connected to) the mounted device 2. Different carrier wave frequencies in different frequency bands are assigned respectively to the down-channel and the up-channel. For example, a frequency in a low frequency band (say, 100 KHz-200 KHz) may be assigned to the down-channel and another frequency in a high frequency band (say 300 MHz-400 MHz) may be assigned to the up-channel.

As will be explained more in detail below, a request signal R is transmitted through the down-channel and an answer signal A is transmitted through the up-channel. The request signal R is a question signal to the portable device 6 and the answer signal is an answer to this question. The portable device 6 is adapted to return the answer signal A if the request signal R is normally received. The request signal R is considered to be received normally if the signal has a field strength greater than a specified level and there are no missing data.

In wireless communication, the field strength is generally the strongest near the transmission antenna and becomes weaker as the distance therefrom increases (inversely proportional to the cube of the separating distance). This characteristic of electromagnetic waves is observed also in the wireless terminal position detection device 7 of this invention. In other words, if the portable device 6 is positioned near the transmitting antennas 3 and 4, the request signal R can be received normally and hence the answer signal A can be returned but if the portable device 6 is separated by a distance greater than a certain magnitude, the answer signal A cannot be returned.

FIG. 1B is a transmission pattern diagram showing the areas in which the request signal R from the transmission antennas 3 and 4 can be normally received.

The first transmission antenna 3 is positioned on the right-hand edge of the vehicle chamber 1a such as inside the right-hand door or on the pillar part of the right-hand door and its transmission pattern has an outwardly pointing area 8a and an inwardly pointing area 8b pointing towards the interior of the vehicle chamber 1a, as indicated by solid lines in FIG. 1B. Similarly, the second transmission antenna 4 is positioned on the left-hand edge of the vehicle chamber 1a such as inside the left-hand door or on the pillar part of the left-hand door and its transmission pattern has an outwardly pointing area 9a and an inwardly pointing area 9b pointing towards the interior of the vehicle chamber 1a, as indicated by chain lines in FIG. 1B. These two patterns are designed so as to be as symmetrical as possible.

Important points about these transmission patterns are that each has an outwardly extending part (8a or 9a), that each has an inwardly extending part (8b or 9b) and that these inwardly extending parts (8b and 9b) nearly overlap each other. In view of the above, it should be understood that the transmission patterns of the transmitting antennas 3 and 4 are not necessarily required to be as shown in FIG. 1B. In principle, they may be circular in shape with the centers at the positions of the antennas 3 and 4 because the portable device 6, when at the right-hand outside position Pa from the vehicle chamber 1a, can normally receive the request signal R from the first transmission antenna 3 and return the answer signal A and, when at the left-hand outside position Pb from the vehicle chamber 1a, can normally receive the request signal R from the second transmission antenna 4 and return the answer signal A. Moreover, if the portable device 6 is inside the vehicle chamber 1c, say, at position Pc, it can receive the request signal R normally from both of the transmission antennas 3 and 4 and return the answer signal A.

Figure 2:
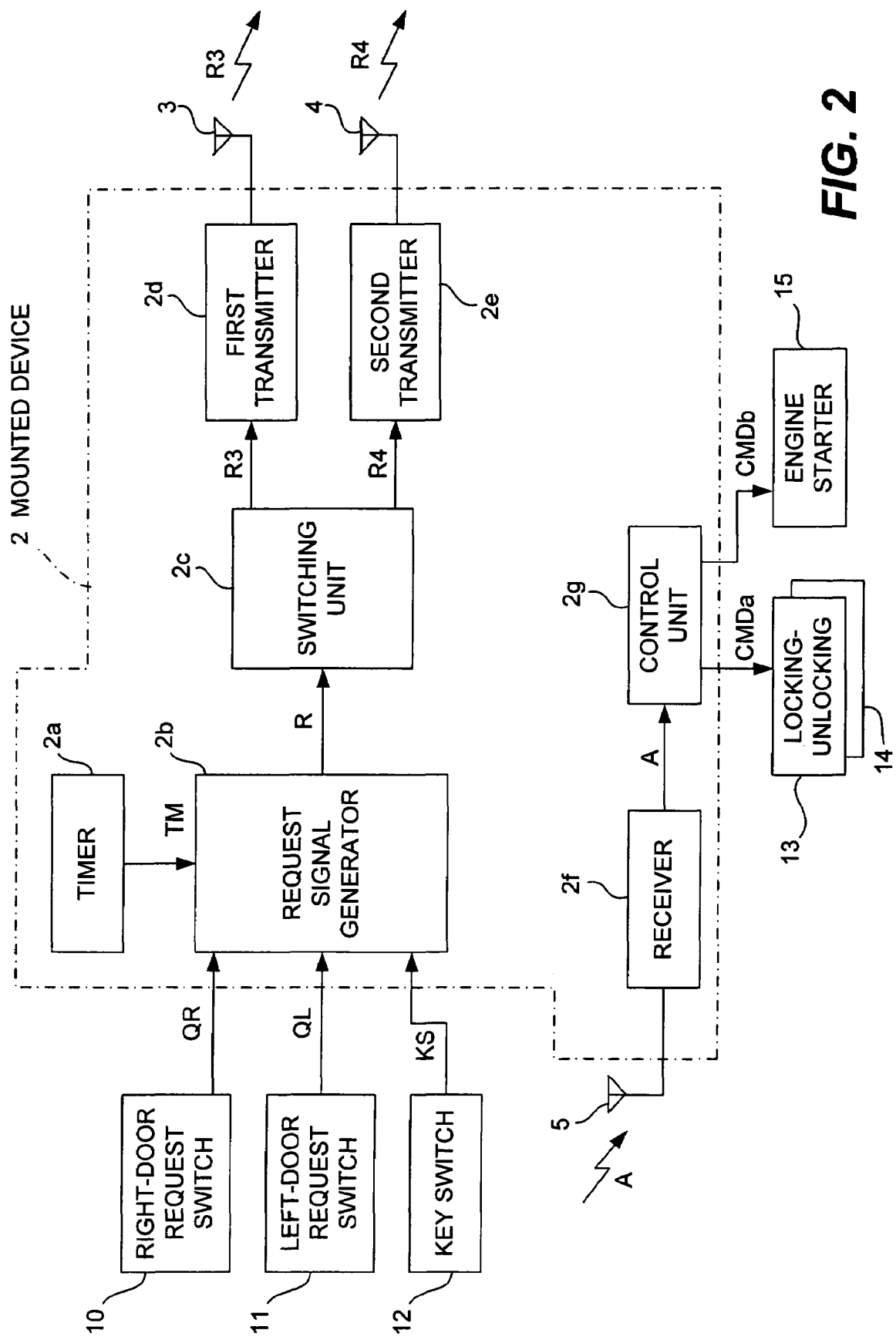
FIG. 2 is a schematic block diagram of the mounted device of FIG. 1.

FIG. 2 is a schematic block diagram of the mounted device 2 shown in FIG. 1. As shown, the mounted device 2 is provided not only with a timer 2a which outputs a timer signal TM periodically at specified time intervals and a request signal generator 2b for generating a specified request signal R in response to the timer signal TM as well as to any of operational signals QR, QL and KS respectively from a right-door request switch 10, a left-door request switch 11 and a key switch 12, but also a switching unit 2c, a first transmitter 2d, a second transmitter 2e, a receiver 2f and a control unit 2g. The timer signal TM generated by the timer 2a is a signal which becomes required for carrying out the position judgment by the portable device 6 periodically. The timer 2a is not a required element if there is no such requirement such as when the position judgment is carried out on the basis of only the operational signals QR, QL and KS from the right-door request switch 10, the left-door request switch 11 and the key switch 12, that is, when such operational signals QR, QL and KS are generated.

The switching unit 2c is for outputting the request signal R directly to the first transmitter 2d, outputting the request signal R directly to the second transmitter 2e or dividing the request signal R into n parts and outputting the divided parts to the first and second transmitters 2d and 2d. Thus, the switching unit 2c is hereinafter also referred to as a signal dividing device and a signal distributing device. These switching operations are carried out according to a switching control signal SEL from the control unit 2g. The signals transmitted from the switching unit 2c to the first and second transmitters 2d and 2e are hereinafter respectively referred to as signals R3 and R4.

The first and second transmitters 2d and 2e serve to modulate the signals R3 and R4 outputted from the switching unit 2c and radiate respectively from the first and second transmission antennas 3 and 4.

The function of the receiver 2f is to demodulate the received signal from the reception antenna 5 and to regenerate the answer signal A from the portable device 6, and the control unit 2g is for controlling the overall operations of the mounted device 2. The principal control functions by the control unit 2g include the control over the generation of the switching control signal SEL, individual verifications and position judgment of the portable device 6 based on the answer signal A regenerated by the receiver 2f, and the generation and output of control signals CMDa and CMDb for necessary vehicle controls (such as locking and unlocking of the door and allowing the key start) based on the result of position judgment and the cause of the generation of the request signal R (whether by TM or any of the signals QR, QL and KS) if the verification result was OK.

The first control signal CMDa is for the control of the locking-unlocking parts 13 and 14 of the right-door and the left-door. It is generated and outputted when the cause for generating the request signal R was QR or QL, the verification result of the portable device 6 was OK and the position judgment result of the portable device 6 satisfies a specified condition (such as being outside the vehicle when the door is to be locked). The second control signal CMDb is for the control of an engine starter 15 and is generated and outputted when the cause for generating the request signal R was KS, the verification result of the portable device 6 was OK and the position judgment result of the portable device 6 satisfies another specified condition (such as being inside the vehicle when the starting of the engine is to be allowed).

Figures 3, 6A, 6B:
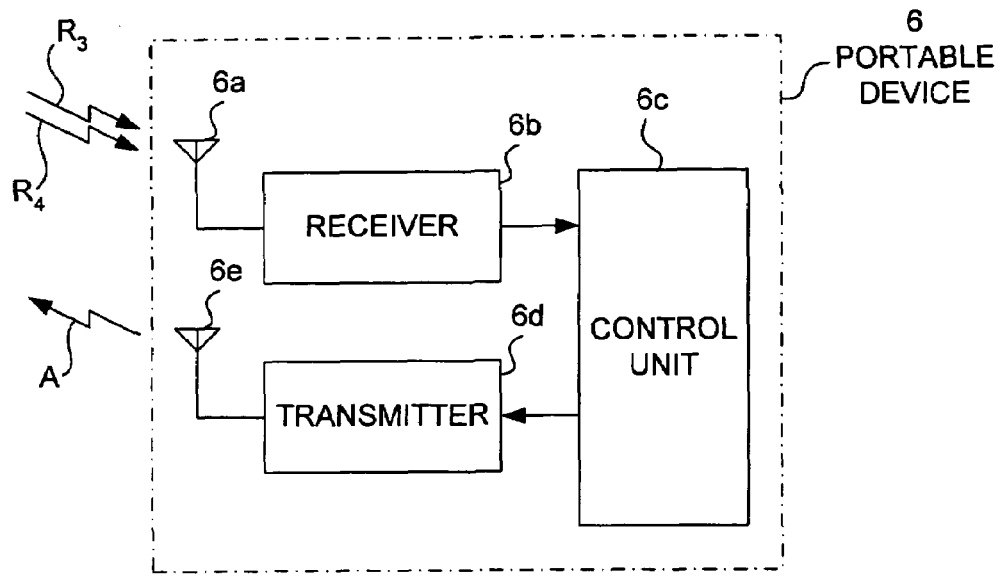
FIG. 3 is a schematic block diagram of the portable device of FIG. 1.
FIGS. 6A and 6B are examples of flag table.

FIG. 3 is a schematic block diagram of the portable device 6 of FIG. 1. As shown, the portable device 6 includes a reception antenna 6a, a receiver 6b, a control unit 6c, a transmitter 6d and a transmission antenna 6e. Its function is to take in the signal received by the reception antenna 6a into the receiver 6b and to regenerate and output the request signals R3 and R4 by this receiver by demodulating it. If the request signals R3 and R4 have been normally regenerated and outputted in a condition with no missing data, the control unit 6c generates an answer signal A including an identification which is preliminarily determined individually for the portable device 6. This answer signal A is modulated by a specified carrier wave by the transmitter 6d, amplified and transmitted into the air from the transmission antenna 6e. The source power for the portable device 6 may be supplied from a battery or may be supplied wholly or in part by a high-frequency signal for power supply.

The operations of the mounted device 2 are explained next with reference to the flowchart shown in FIGS. 4 and 5. These operations are carried out periodically at a specified frequency.

The mounted device 2 initially checks the trigger input (Step S11). In the above, the trigger input means any event that caused the request signal R to be generated and this happens when any of the signals TM, QR, QL and KS shown in FIG. 2 becomes active. Whenever any of these signals has been activated (YES in Step S11), an initialization process is carried out (Step S12), inclusive of the step of returning the flag table (to be explained below) to the initial condition.

After the initialization, it is determined whether the portable device 6 is inside the vehicle chamber or not. For this purpose, a request signal R is generated first by the request signal generator 2b (Step S13) and the generated request signal R is divided into n parts (Step S14) where n indicates the number of transmission antennas connected to the mounted device 2 and hence is equal to 2 in the example shown in FIG. 2. In other words, the request signal R generated in Step S13 is divided into two parts in this example.

Next, the antenna-indicating dummy index i is initially set equal to 1 (Step S15) to select the $i^{th}$ antenna (the first transmitting antenna 3 in the example described above) (Step S16) and this selected antenna is used to transmit the $i^{th}$ part of the divided request signal (Step S17).

Next, the value of the dummy index i is incremented by 1 (Step S18) and then the incremented value of i is compared with n (Step S19). In the present case, the incremented value of i is 2 and since the condition i>n is not satisfied (NO in Step S19), the steps after Step S16 are repeated by selecting the second (1+1=2) transmission antenna 4 in the example of FIG. 1 to transmit the second divided part of the request signal (Step S17).

After the divided request signals have thus been transmitted both from the first and second transmission antennas 3 and 4, the dummy index i is further incremented by 1 (Step S18). This time, the newly incremented dummy index assumes the value of 3 (=2+1) and the condition i>n is now satisfied (YES in Step S19). The program therefore does not return to Step S16, and it is checked whether any answer signal A has been received (Step S20).

If it is found that no answer signal A has been received (NO in Step S20), it is checked to determine whether or not a specified number of retrials have been repeated (Step S21). If retrials have not been repeated for the specified number of times (NO in Step S21), the program returns to Step S15 and the subsequent steps are repeated. If an answer signal A was received within a specified number of retrials (YES in Step S21), the $i^{th}$ flag (the third flag in the example described above) is switched on (Step S22). It is to be noted that this operation for switching on a flag is carried out only when an answer signal A has been received.

If the answer signal A has been received and the third flag has been switched on, the position of the portable device 6 is judged according to the content of the flag table (Step S32) and the control process such as generating and outputting signal CMDa or CMDb is carried out (Step S33) according to the result of the judgment. If no answer signal A was received after the specified number of retrials have been carried out (NO in Step S21), a series of steps is carried out next to determine whether the portable device 6 may not be found outside the vehicle chamber.

This search for the portable device 6 outside the vehicle chamber starts by generating a request signal R in the request signal generator 2b (Step S23) and setting the antenna selecting dummy index i equal to 1 (Step S24). This means that the first transmission antenna 3 has been selected (Step S25) and used to transmit the request signal R just generated (Step S26). It is to be noted that it is the request signal R without being divided that is transmitted this time.

Next, it is determined whether an answer signal A has been received (Step S27). If no answer signal A is received (NO in Step S27) and if retrials have not been repeated a specified number of times (NO in Step S28), the program returns to Step S26 and the subsequent steps are repeated.

If an answer signal A has been received from the portable device 6 within the specified number of retrials (YES in Step S28), the $i^{th}$ flag is switched on (Step S29). Since i=1 currently, this means that it is the first flag that is switched on. It is to be reminded again that this operation of switching on the flag is carried out only when an answer signal A has been received.

Next, the antenna-selecting dummy index i is incremented by 1 (Step S30) and checked whether or not i>n (Step S31) where n is as defined above. Since n=2 in this example and i has now been incremented to 2 (=1+1), the condition i>n is not satisfied (NO in Step S31), and the program returns to Step S25 and the $i^{th}$ antenna is selected again. Since i=2 now, it is the second transmitting antenna 4 that is selected to transmit the request signal generated in Step S23 (Step S26).

Next, it is determined whether an answer signal A has been received (Step S27). If no answer signal has been received (NO in Step S27) and if retrials have not been repeated for a specified number of times (NO in Step S28), Step S26 and the steps thereafter are repeated. If an answer signal A has been received within the specified number of retrials (YES in Step S28), the $i^{th}$ flag is switched on (Step S29). Since i=2 currently, this means that it is the second flag that is switched on in this case. This operation of switching on the flag is carried out only when an answer signal A is received.

Next, the dummy index i is incremented by 1 (Step S30) and it is checked to determine whether the condition i>n is satisfied (Step S31). Since i=3 at this moment and this condition is satisfied (YES in Step S31), the program does not return to Step S25 and the position judging process for the portable device 6 is carried out (Step S32) and the controls of Step S33 as explained above are effected.

FIG. 6A shows an example of flag table 16 formed with (n+1) records RC1-RC3 each consisting of a flag number field 16a and a flag value field 16b. RC1 corresponds to the first flag, RC2 corresponds to the second flag and RC3 corresponds to the third flag in the example above. When initialized (in Step S12 of FIG. 4), "0" is set in all flag value fields.

Let us now assume that the portable device 6 is at one of the positions Pa, Pb and Pc shown in FIG. 1B. Positions Pa and Pb are outside the vehicle, and position Pc is inside the vehicle.

Figure 7A:
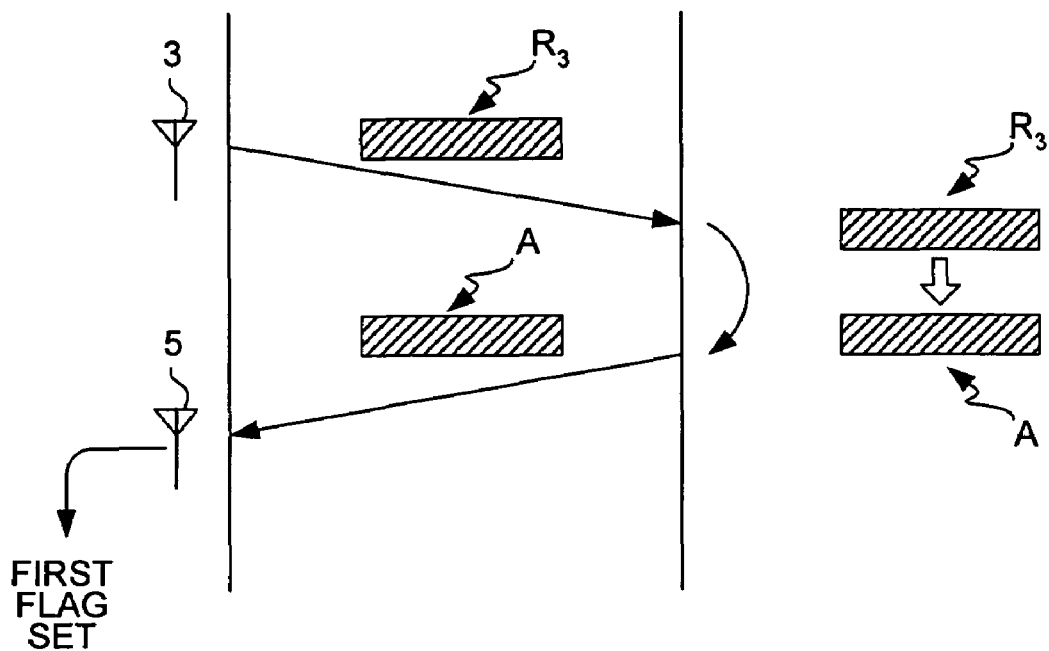
FIGS. 7A and 7B are respectively a timing chart when the first or second transmission antenna is used to transmit a request signal.

Position Pa is inside area 8a where communication is possible only by the first transmission antenna 3. Thus, the portable device 6 responds only to the non-divided request signal R (=R3) from the first transmission antenna 3, returning the answer signal A accordingly. FIG. 7A is a timing chart when the non-divided request signal R (=R3) is transmitted from the first transmission antenna 3. The portable device 6, which is at position Pa, receives this request signal R (=R3) normally and returns an answer signal A. Thus, with reference to FIG. 5, the response in Step S27 becomes YES only when i=1 and hence "1" is set in the flag value field 16b of the first flag (corresponding to RC1 in the flag table).

Figure 7B:
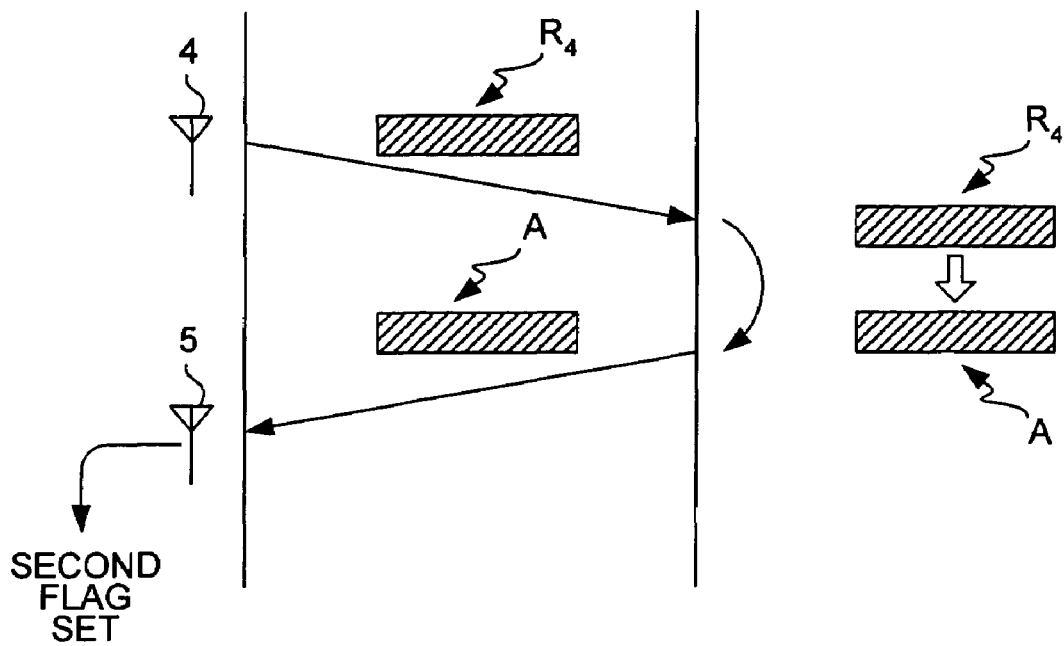

Position Pb is inside area 9a where communication is possible only by the second transmission antenna 4. Thus, the portable device 6 responds only to the non-divided request signal R (=R4) from the second transmission antenna 4, returning the answer signal A accordingly. FIG. 7B is a timing chart when the non-divided request signal R (=R4) is transmitted from the second transmission antenna 4. The portable device 6, which is at position Pb, receives this request signal R (=R4) normally and returns an answer signal A. Thus, with reference to FIG. 5, the response in Step S27 becomes YES only when i=2 and hence "1" is set in the flag value field 16b of the first flag (corresponding to RC2 in the flag table).

Figure 8:
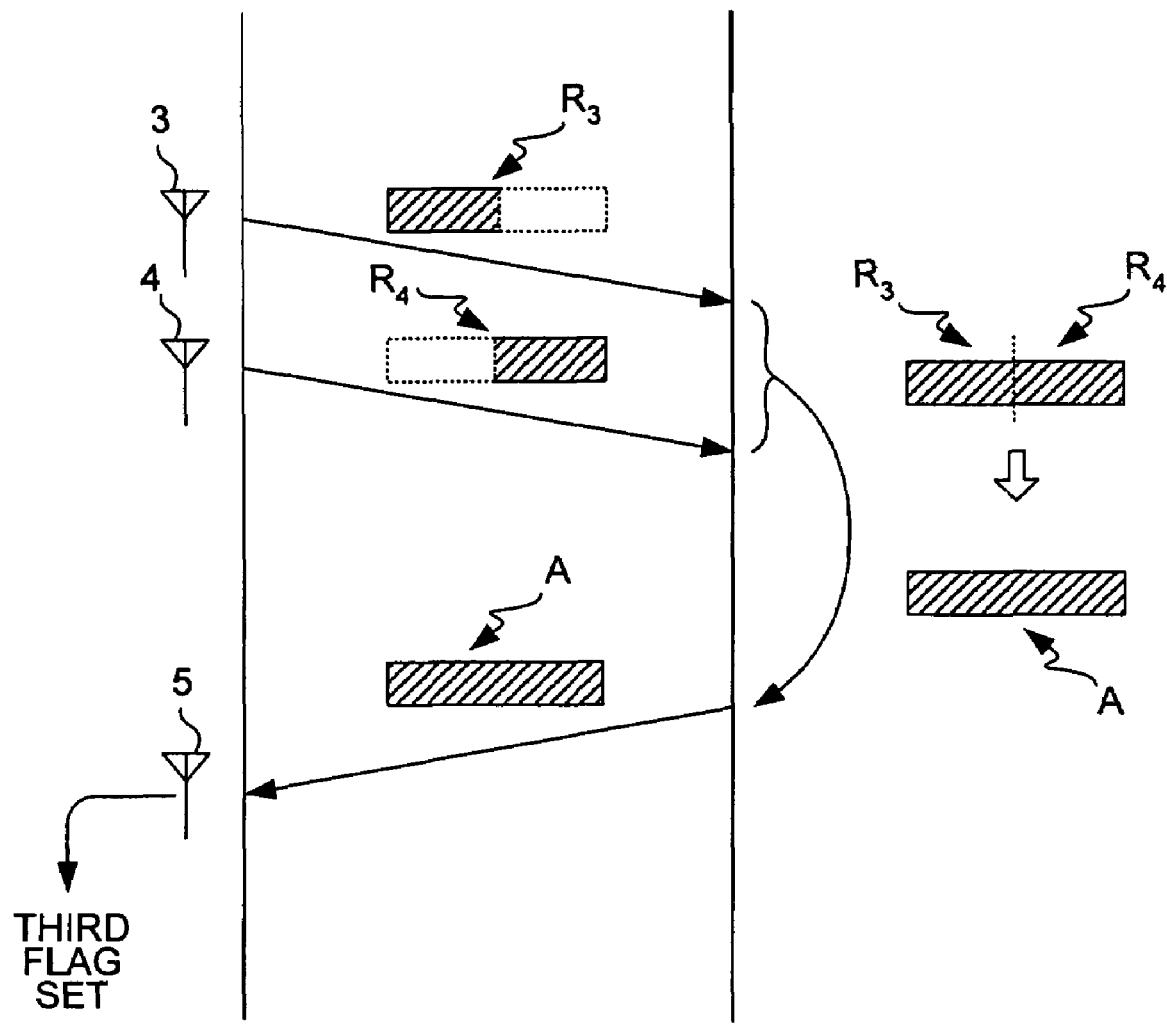
FIG. 8 is a timing chart when both the first and second transmission antennas are used to transmit divided request signals.

Position Pc is inside both area 8b where communication is possible with the first transmission antenna 3 and area 9b where communication is possible with the second transmission antenna 4. Thus, the portable device 6 receives the first divided portion (R3) of the request signal R from the first transmission antenna 3 and the second divided portion (R4) of the request signal R from the second transmission antenna 4, synthesizing both and returning an answer signal A in response to this synthesized request signal (R3+R4). FIG. 8 is a timing chart when the divided request signal R (R3 and R4) is transmitted by using both the first and second transmission antennas 3 and 4. The portable device 6 receives this synthesized request signal normally to return the answer signal A. Thus, with reference to FIG. 4, the response in Step S20 becomes YES, "1" is set in the flag value field 16b of the third flag (corresponding to RC3 in the flag table). As it is thus concluded that the portable device 6 is inside the vehicle chamber, the search outside the vehicle according to the flowchart of FIG. 5 would be wasteful and is not carried out.

FIG. 6B shows the conditions of the flag table 16 at these three positions Pa, Pb and Pc. Flag value field 16b-1 corresponds to position Pa, flag value field 16b-2 corresponds to position Pb, and flag value field 16b-3 corresponds to position Pc.

As can be understood easily from FIG. 6A, if "1" is set only for the first flag (RC1), it indicates that the portable device 6 is at position Pa, if "1" is set only for the second flag (RC2), it indicates that the portable device 6 is at position Pb, and if "1" is set only for the third flag (PC3), it indicates that the portable device 6 is at position Pc. Positions Pa and Pb are outside the vehicle, while position Pc is inside the vehicle. Thus, it can be ascertained whether the portable device 6 is inside or outside the vehicle merely from the status of the flags in the flag table 16.

In summary, according to this invention, there is no need to provide a transmission antenna dedicated to the interior of the vehicle. Instead, use is made of n antennas for both inside and outside to determine whether the portable device 6 is inside or outside the vehicle. Thus, the number of transmission antennas can be reduced and hence the production cost of the system can be lowered. Moreover, since the divided request signals contain the same data as the request signal before the division, they are not different, when synthesized, from the original request signal and hence the structure of the portable device 6 need not be changed at all to be used for the present invention.

Figure 5:
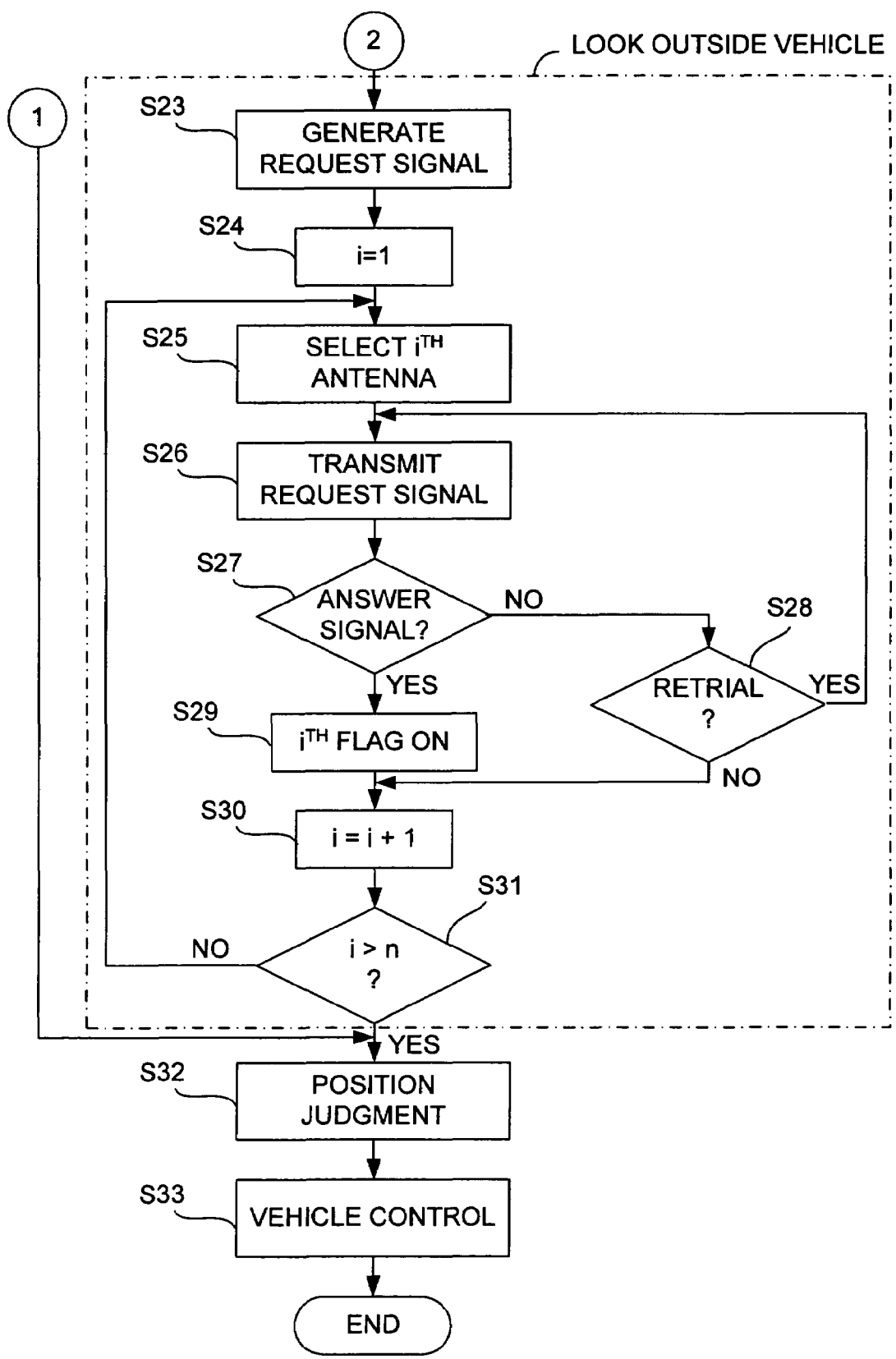

It is to be noted in FIG. 5 that Steps S23–S31 are repeated n times, or that the transmission of the request signal R is repeated n times. When the request button on the right-hand door or on the left-hand door is pressed, however, it is practically sufficient to transmit the request signal R only from the transmission antenna corresponding to the door on the side of which the request button has been pressed and the transmission of the request signal R from the other transmission antenna is wasteful.

Figure 9:
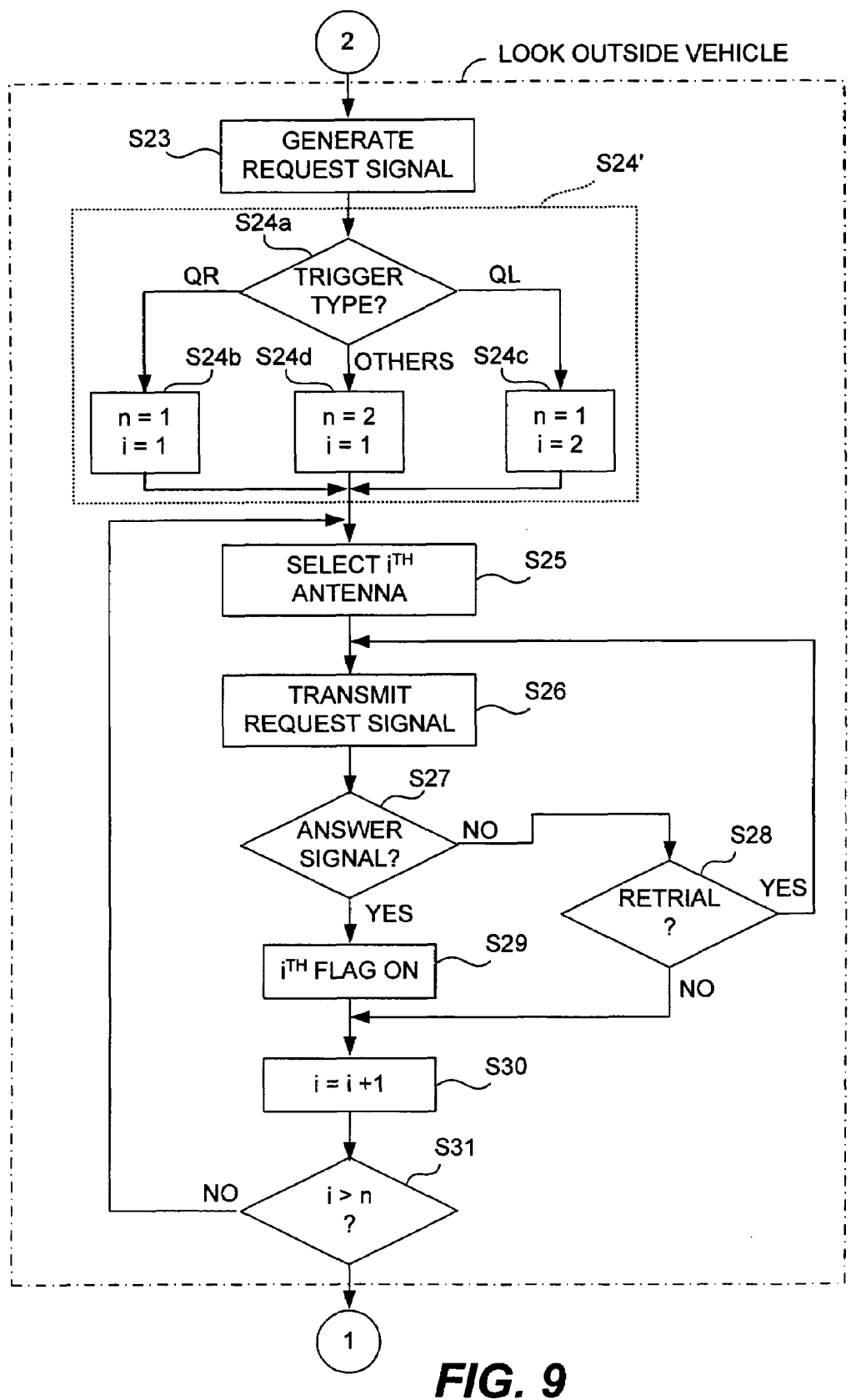
FIG. 9 is an improved flowchart for the operations of the mounted device.

In view of the above, FIG. 9 shows a portion of an improved flowchart, replacing Steps S23–S31 of FIG. 5. FIG. 9 is different from FIG. 5 only in that Step S24 of FIG. 5 is replaced by Step S24' wherein the type of the trigger is firstly determined (Step S24a). If the trigger for the generation of the request signal is QR (from the right-door request switch 10), n and i are both set equal to 1 (Step S24b), if it is QL (from the left-door request switch 11), n and i are respectively set equal to 2 and 1, and if it is other than QR and QL, n and i are respectively set equal to 1 and 2 (Step S24d).

With a program thus set, if the right-door request switch 10 has been operated on, the portable device 6 should be somewhere near the door on the right-hand side and since i=1 in this case, a request signal R can be transmitted from the first transmitting antenna 3. Similarly, if the left-door request switch 11 has been operated on, the portable device 6 should be somewhere near the door on the left-hand side and since i=2 in this case, a request signal R can be transmitted from the second transmitting antenna 4. In either case, since n=1, the judgment result in Step S31 is YES and hence the loop comprising Steps S25–S31 is not repeated. This means that wasteful signal transmission processes are not carried out. Moreover, if the trigger type is other than QR or QL, since n and i are respectively set equal to 2 and 1, the flowchart shown in FIG. 5 will be carried out.

Figure 4:
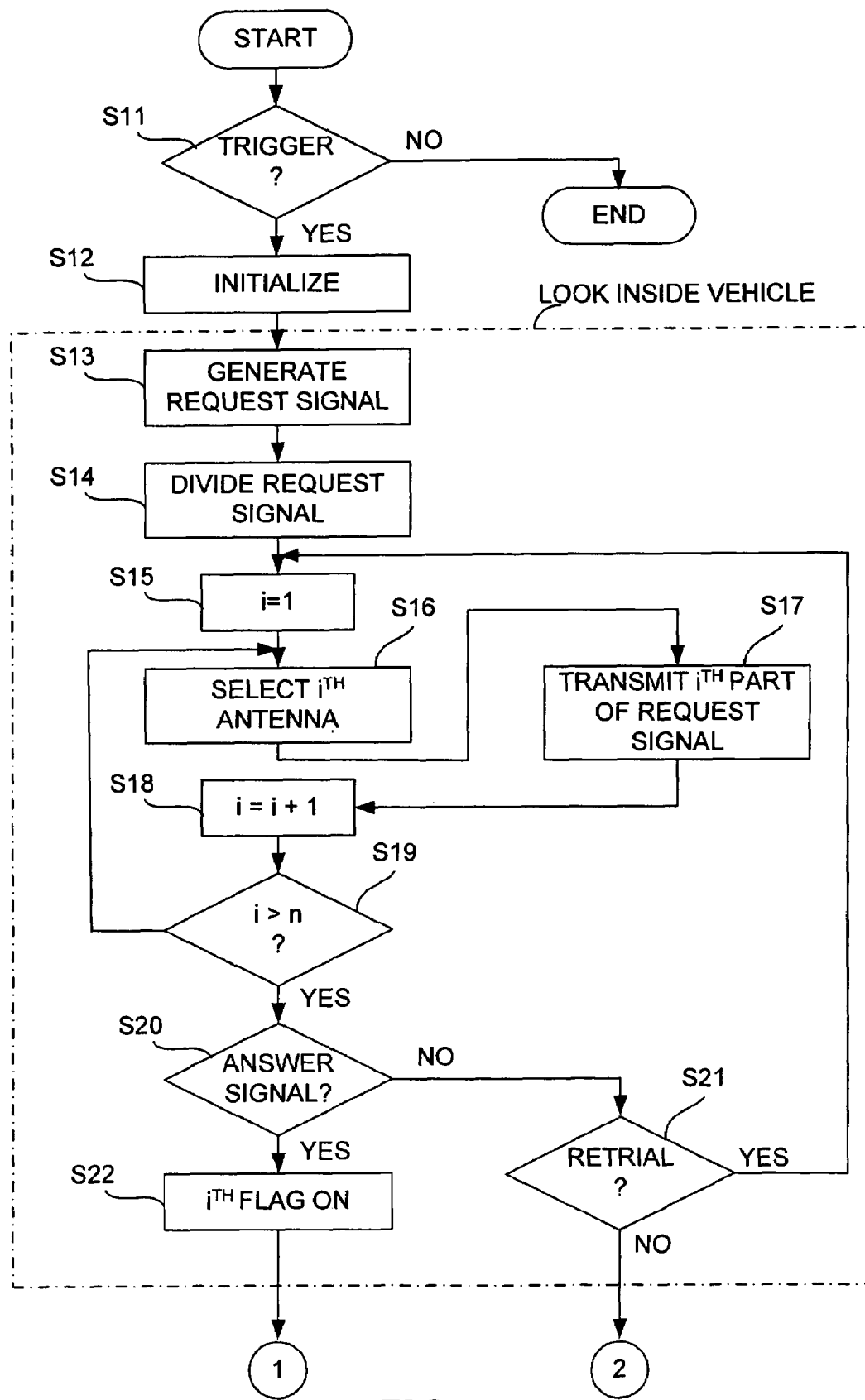
FIGS. 4 and 5 are a flowchart for showing the operations of the mounted device.

Although the flowcharts in FIGS. 4, 5 and 9 show the best modes of the present invention, if the use's only wish is to prevent the portable device 6 from being inadvertently left inside the vehicle, it will be necessary only to ascertain whether or not it is inside the vehicle (at Pc). In such a situation, the portion from Step S23 to Step S31 may be skipped. In other words, after the judgment of NO in Step S21, the program may proceed to Step S32 of FIG. 5. In this case, only the third flag (or RC3) of the flag table of FIG. 6 will be utilized. In other words, "0" or "1" will be set in the value field 16b of RC3, depending on whether or not the portable device 6 is inside the vehicle or not.

When the user's only wish is to ascertain whether or not the portable device 6 is inside the vehicle, it may be proposed to transmit a non-divided request signal R from each of the first and second transmission antennas 3 and 4. This, however, is not recommendable because the request signal R will have to be transmitted twice and it will take twice as long. By the routine described above, by contrast, a first divided part and a second divided part are transmitted and this takes the time for transmitting only one request signal R and hence the communication time can be reduced.

Figure 10:
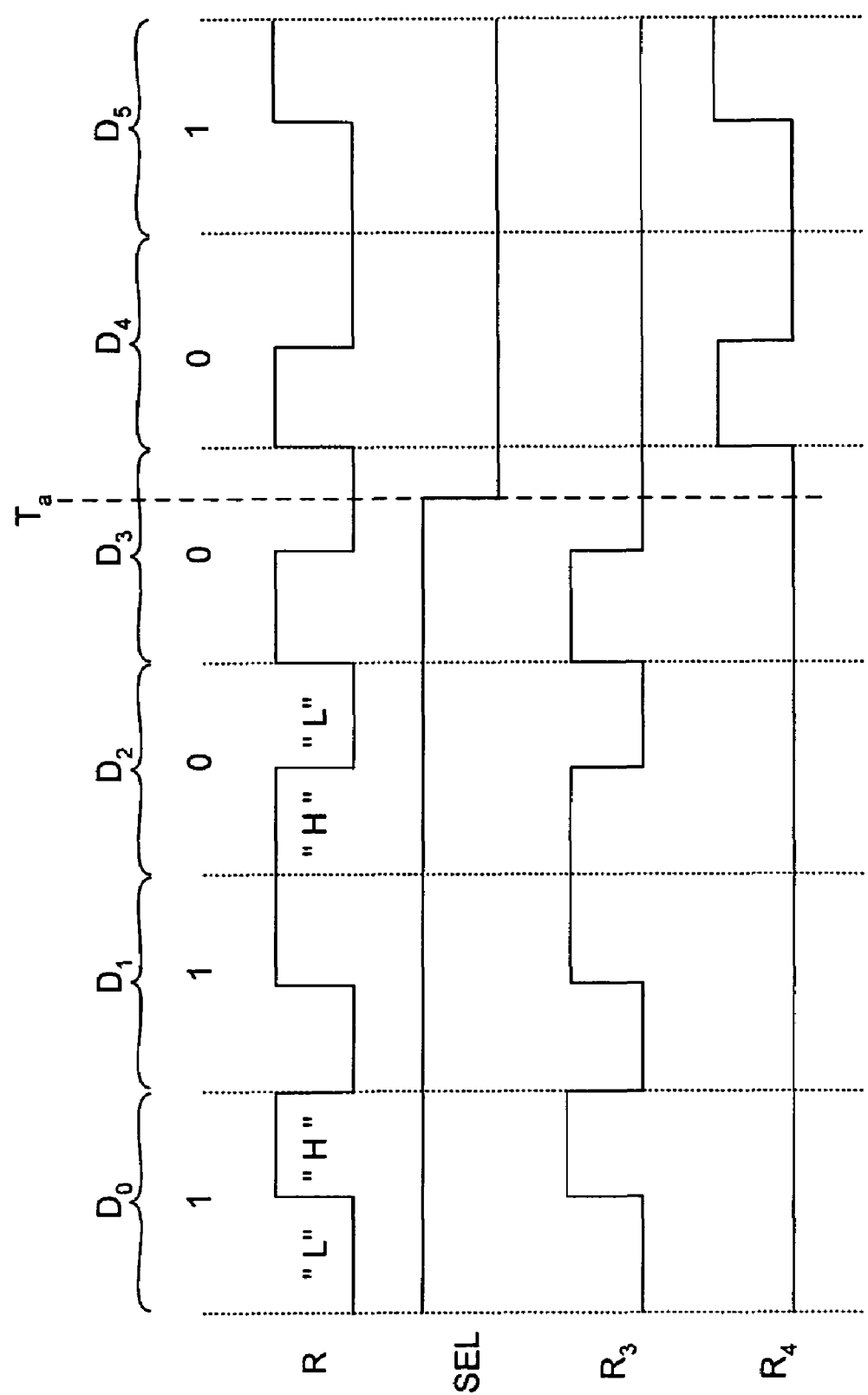
FIG. 10 is a waveform diagram for showing an example of divided request signal.

FIG. 10 shows an example of how the request signal R may be divided. Although there is no particular limitation imposed on the data for the request signal R, it is assumed to be Manchester-encoded. In other words, each data bit is a repetition of duty 50%, representing "1" when the first half is L-level and the second half is H-level and representing "0" when the first half is H-level and the second half is L-level.

Let us assume now that R3 becomes equal to R when the switching control signal SEL is H and R4 becomes equal to R when SEL is L and that SEL is switched from H to L at a selected time Ta. Then, as shown in FIG. 10, the first divided part R3 of the request signal R includes data bits $D_0$, $D_1$, $D_2$ and $D_3$ (a portion thereof) and the second divided part R4 of the request signal R includes data bits $D_3$ (the rest thereof), $D_4$ and $D_5$. Since the portable device 6 receives the first and second divided parts R3 and R4 of the request signal R, it can regenerate the original data ($D_0$–$D_5$) of the request signal R without any missing part.

Figures 11A, 11B:
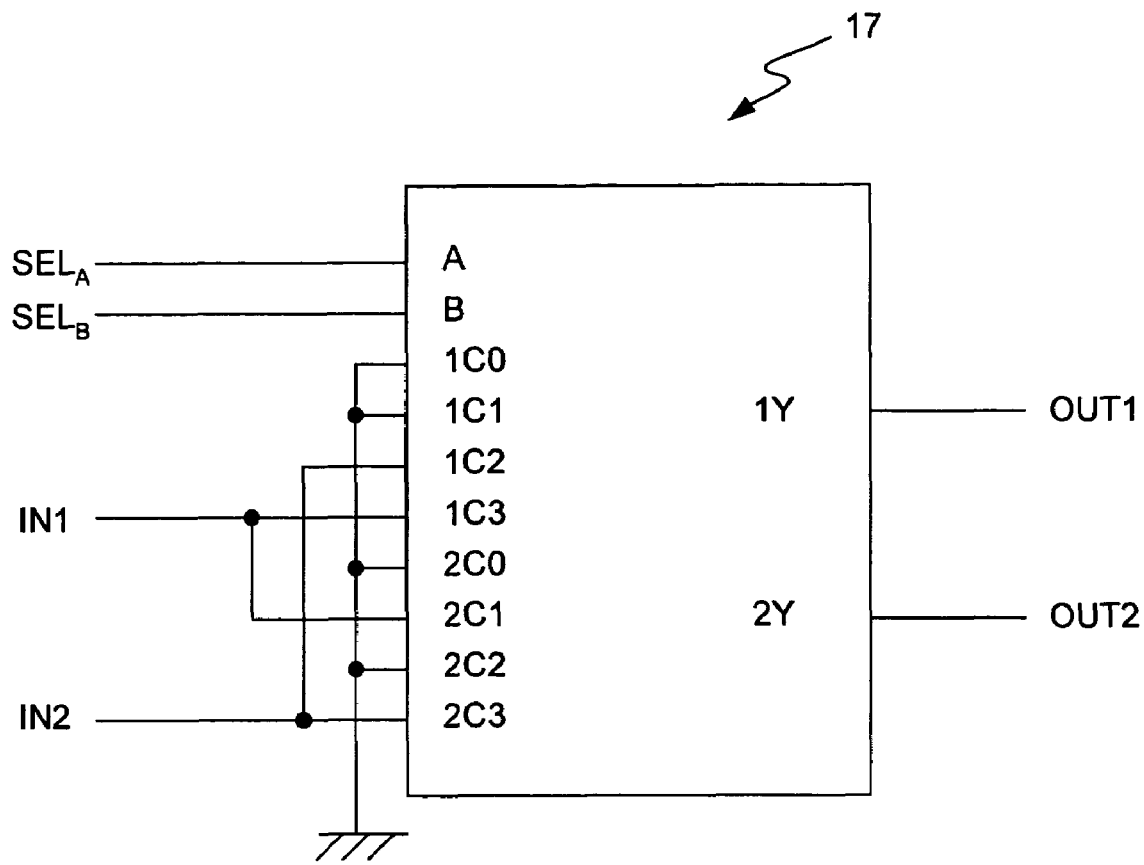
FIG. 11A is a circuit diagram of the switching unit.
FIG. 11B is a true value diagram for the selector shown in FIG. 11A.

FIG. 11A shows an example of the circuit structure of the switching unit 2c, using a "4 to1" selector 17 such as the "LS74153" series, having two pairs of 4-bit data input terminals (1C0–1C3 and 2C0–2C3) and two data output terminals (1Y and 2Y). It is also provided with enable terminals for enabling and disabling each of a power source terminal and the two pairs of 4-bit data input terminals but they are not illustrated for simplifying the disclosure.

In FIG. 11A, $SEL_A$ and $SEL_B$ indicate SEL signals from the control unit 2g, IN1 and IN2 indicate request signals R from the request signal generator 2b, and OUT1 and OUT2 indicate output signals respectively to the first transmitter 2d and the second transmitter 2e. Ground voltage (at L level) is applied to terminals 1C0, 1C1, 2C0 and 2C1. Signal IN1 is supplied to 1C3 and 2C1, and signal IN2 is supplied to 1C1 and 2C3.

FIG. 11B is a true value diagram for the selector 17 according to which the connection combination is determined between the two pairs of 4-bit data input terminals (1C0–1C3 and 2C0–2C3) and the two data output terminals (1Y and 2Y), depending on the logic combination of the two select input terminals (A and B). Explained more in detail, when A=B=L, 1C0=OUT1 and 2C0=OUT2; when A=H and B=L, 1C1=OUT1 and 2C1=OUT2; when A=L and B=H, 1C2=OUT1 and 2C2=OUT2; and when A=B=H, 1C3=OUT1 and 2C3=OUT2.

Since 1C0=1C1=2C0=2C2L, 1C2=2C3=IN2 and 1C3=2C1=IN1, as explained above, this means that OUT1=OUT2=L when A=B=L; OUT1=L and IN1=OUT2 when A=H and B=L; IN2=OUT1 and OUT2=L when A=L and B=H; and IN1=OUT1 and IN2=OUT2 when A=B=H.

Figure 12:
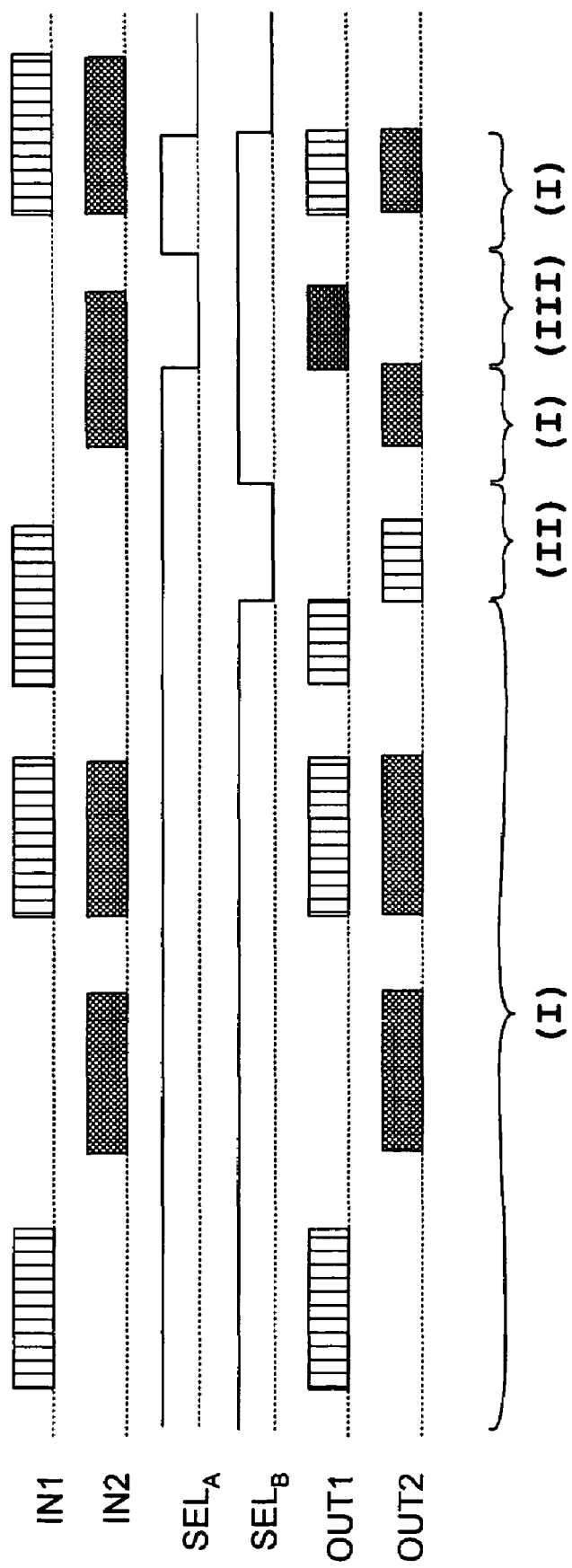
FIG. 12 is a preferred time chart for IN1, IN2, $SEL_A$ and $SEL_B$.

FIG. 12 is a preferred time chart for IN1, IN2, $SEL_A$ and $SEL_B$. During Period I when both $SEL_A$ and $SEL_B$ are at H level, IN1 and IN2 can be directly taken out from OUT1 and OUT2. During Periods II and III when $SEL_A$ and $SEL_B$ are different in logic, only one of IN1 and IN2 can be taken out of OUT1 or OUT2. During Period II when $SEL_A$=H and $SEL_B$=L, IN1 can be taken out of OUT2. During Period III when $SEL_A$=L and $SEL_B$=H, IN2 can be taken out of OUT1. This shows that by using a "4 to1" selector 17 such as "LS74153" series, IN1 and IN2 can be divided at any timing and taken out from a desired output terminal (OUT1 or OUT2).

When the request signal R is divided, it need not be divided either into two equal parts or even into two parts. In other words, the request signal R may be divided into two mutually unequal parts or into three or more parts.

Figure 13A:
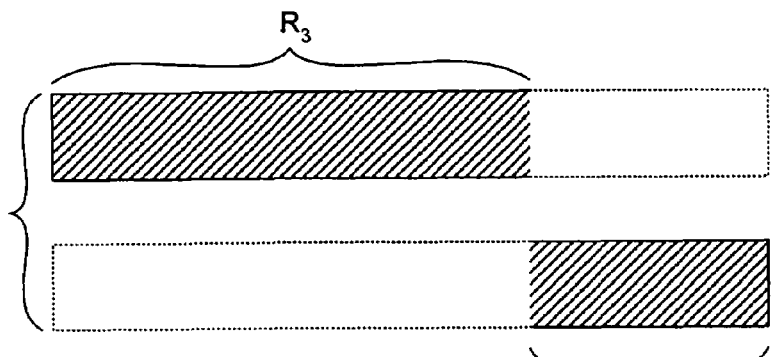
FIGS. 13A, 13B, 13C and 13D are diagrams for showing different ways in which a request signal R may be divided.
Figure 13B:
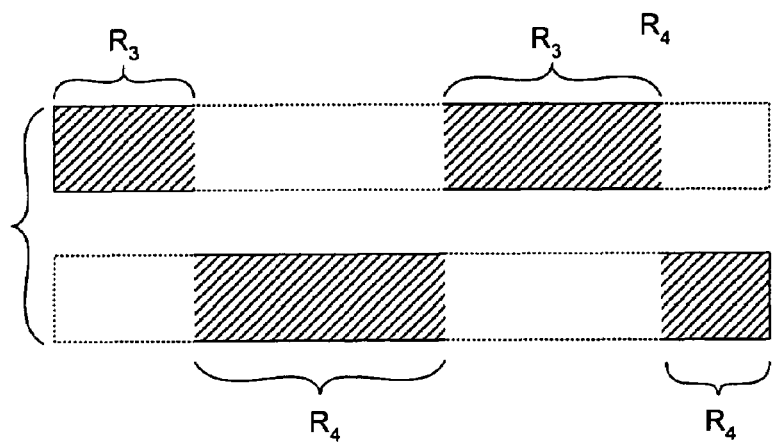
Figure 13C:
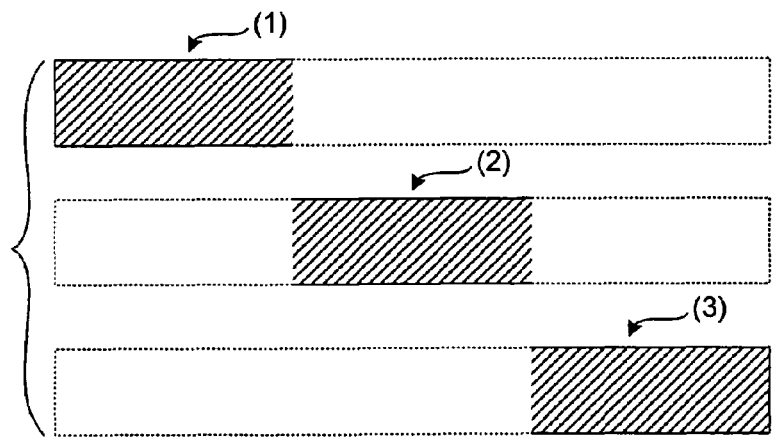
Figure 13D:
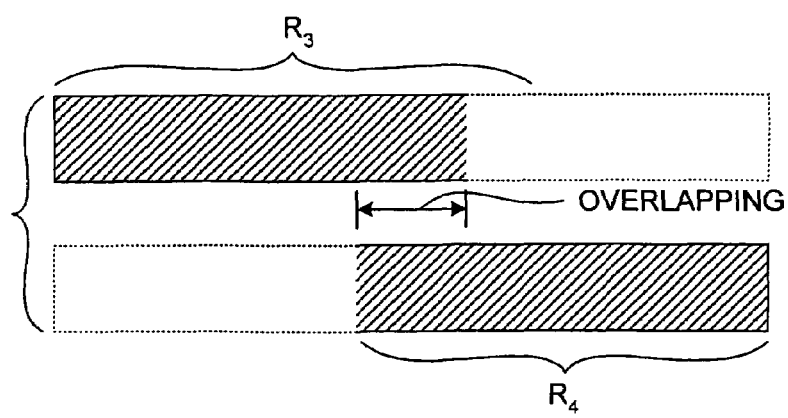

FIGS. 13A, 13B, 13C and 13D show different ways in which a request signal R may be divided. FIG. 13A is an example of dividing a request signal R into unequal parts R3 and R4 such that R3>R4. FIGS. 13B and 13C are examples of dividing it into three or more parts, FIG. 13B being an example of dividing it into 4 parts and making them alternately into R3 and R4 and FIG. 13C being an example of dividing into three parts (1), (2) and (3). FIG. 13D is an example which may be applied to any of the above, having an overlap portion F such that occurrence of a missing portion can be dependably prevented.

What is claimed is:

1. A wireless terminal position detecting device comprising:
   a portable device;
   a plural n-number of transmission antennas each having a reachable area inside which communication is possible, said transmission antennas being disposed such that a portion of the reachable areas of said transmission antennas overlap;
   a signal dividing device for dividing a request signal into said plural n-number of divided parts; and
   a signal distributing device for causing said divided parts to be transmitted sequentially each from different one of said transmission antennas;
   wherein said portable device serves to synthesize said divided parts of said request signal to thereby receive a synthesized request signal as the request signal before the division and to return an answer signal in response to said synthesized request signal; and
   wherein the position of said portable device is detected based on said answer signal returned from said portable device in response to said request signal.

2. The wireless terminal position detecting device of claim 1 wherein said signal dividing device divides said request signal into said divided parts such that said divided parts have mutually overlapping parts.

3. A wireless method of detecting the position of a portable device, said method comprising the steps of:
   positioning a plural n-number of transmission antennas each having a reachable area inside which communication is possible, said transmission antennas being disposed such that a portion of the reachable areas of said transmission antennas overlap;
   dividing a request signal into said plural n-number of divided parts; and
   causing said divided parts to be transmitted sequentially each from different one of said transmission antennas; and
   causing said portable device to synthesize said divided parts of said request signal to thereby receive a synthesized request signal as the request signal before the division and to return an answer signal in response to said synthesized request signal;
   wherein the position of said portable device is detected based on said answer signal returned from said portable device in response to said request signal.

4. The wireless method of claim 3 wherein said request signal is divided into said divided parts such that said divided parts have mutually overlapping parts.

5. A wireless terminal position detecting device comprising:
   a portable device;
   a plural n-number of transmission antennas each having a reachable area inside which communication is possible, said transmission antennas being disposed such that a portion of the reachable areas of said transmission antennas overlap;
   a signal dividing device for dividing a request signal into said plural n-number of divided parts;
   a signal distributing device for causing said divided parts to be transmitted sequentially each from different one of said transmission antennas; and
   a control unit for detecting the position of said portable device based on an answer signal returned from said portable device in response to said request signal;
   wherein said portable device serves to synthesize said divided parts of said request signal to thereby receive a synthesized request signal as the request signal before the division and to return said answer signal in response to said synthesized request signal.

* * * * *